Nov. 19, 1968   L. A. KUBICEK   3,411,386
DEBURRING TOOLS

Filed Dec. 5, 1966   2 Sheets-Sheet 1

INVENTOR
LOUIS A. KUBICEK

BY *Hauke, Krass, & Gifford*
ATTORNEYS

INVENTOR
LOUIS A. KUBICEK

BY *Hauke, Kraus, & Gifford*
ATTORNEYS

United States Patent Office 3,411,386
Patented Nov. 19, 1968

3,411,386
DEBURRING TOOLS
Louis A. Kubicek, Detroit, Mich., assignor to Burr-Ban Tool Service Company, Detroit, Mich., a corporation of Michigan
Filed Dec. 5, 1966, Ser. No. 599,273
8 Claims. (Cl. 77—73.5)

ABSTRACT OF THE DISCLOSURE

A cutting tool having a cylindrical body formed with a through slot to provide a pair of spaced apart spring arms with the cutting edges formed on the spring arms and having means for adjusting the spring tension of the spring arms.

---

Figure 1:
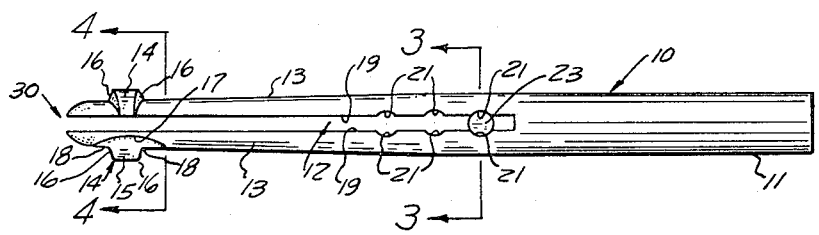

The present invention relates to tools, particularly to a tool for removing the burrs formed on the edges of drilled holes and more particularly to an improved form of those deburring tools which may be used to deburr the edges of opposite ends of the holes drilled through a workpiece.

When holes are drilled, ridges or burrs are often produced on the surfaces of the material being drilled. Generally, it is necessary or desirable to remove these burrs to facilitate assembly or to produce a finished product. Patent No. 3,217,570 issued to Glen H. Cogsdill on Nov. 16, 1965 and Patent No. 3,230,798 issued to Louis A. Kubicek and Joseph L. Toth on Jan. 25, 1966 disclose and claim improved deburring tools characterized by the provision of a cylindrical body having a through slot formed therein to provide a pair of spaced apart spring arms. The spring arms are adapted to be flexed toward and away from one another and form integral extensions of the unslotted portion of the body. Each of the spring arms is provided with a cutting tool comprising a radial enlargement formed with a cutting edge which extends generally transversely to the longitudinal axis of the slot. Means are provided in each of these deburring tools for adjusting the spring tension of the spring arms. In the Cogsdill patent, the adjusting means takes the form of a plunger extending axially into the slot formed between the spring arms and being axially adjustable to vary the effective length of the slot and thus to vary the tension required to flex the spring arms toward one another. In the Kubicek et al. patent, the spring tension adjusting means takes the form of a collar axially slidably mounted on the exterior surface of the spring arms and provided with a pin adapted to extend inwardly into the slot formed between the spring arms. Axial movement of the collar and the pin then will vary the spring tension produced by the spring arms. A set screw fixes the collar in the desired longitudinal position.

While the tools of these patents have generally proven to be satisfactory, in some installations it is not necessary to have the range of infinite adjustment as afforded by the tension adjusting means of these tools. In many installations the tolerance of permissible tension is wide so that if the tool is capable of adjustment through several finite positions this is enough. Once the proper adjustment is determined for a given job it is not generally necessary to adjust the spring tension again during the life of the tool. Further, it is apparent that in the tools of the heretofore mentioned patents it is possible that vibrations will loosen the screws which in each case fix the adjustment means in the desired position to permit the adjustment means to move to a new position so that the spring tension which is required to perform the particular cutting task would no longer be produced by the device. Also in some installations, the fixtures, bushings or the like reduce the clearance for the deburring tool to the extent that it may not be possible to use the tool with the collar like that shown in the Kubicek et al. patent in place. In such installations it still may be desirable to provide tension adjustment and this has not heretofore been possible with the Kubicek type tool.

The present invention provides improved deburring tools of the type disclosed in the aforementioned patents but characterized by the provision of a new means for adjusting the spring tension of the spring arms. To produce the desired adjustment the faces of the spring arms defining the slot are provided with a plurality of transversely extending grooves which are adapted to receive and retain a pin member. The pin member can be positioned in any pair of the pairs of opposing grooves to adjust the spring tension of the spring arms. The dimensions of the pin and grooves are such that in the normal position of the spring arms the pin is frictionally retained in place. During use of the tool the spring arms are flexed toward each other to more firmly grip the pin member so that there is little danger of the tools requiring readjustment during use. If it is desired to adjust the tension of the spring arms the pin is knocked out of the grooves in which it is positioned and reinserted in another pair of grooves.

It is apparent that unlike the adjusting means of the aforementioned patents the present adjusting means produces little danger of accidental misadjustment. Further, in those situations where such a tool can be used, that is where fine adjustment is not necessary and where once the tool is adjusted it probably will not need to be adjusted again, the tool of the present invention can be readily used and since it is constructed of fewer parts and requires fewer costly machining operations it can be provided at a lower cost.

It is an object then of the present invention to improve deburring tools of the type disclosed in the aforementioned patents by providing a new spring tension adjusting means for such tools.

It is a further object of the present invention to reduce the cost of manufacturing deburring tools of the aforementioned type and having spring tension adjusting means by providing such a tool with a series of transversely extending grooves formed in the faces of the spring arms defining the longitudinal slot therebetween and by providing a pin adapted to be securely received in any pair of the pairs of grooves provided to thereby adjust the spring tension of the spring arms.

It is another object of the present invention to reduce the possibility of such tools becoming accidentally out of adjustment during use by providing a new adjustment means for such tools characterized by the absence of any threaded or screw type locking means which could become accidentally loosened by vibrations of the tool as it is being used.

Figure 2:
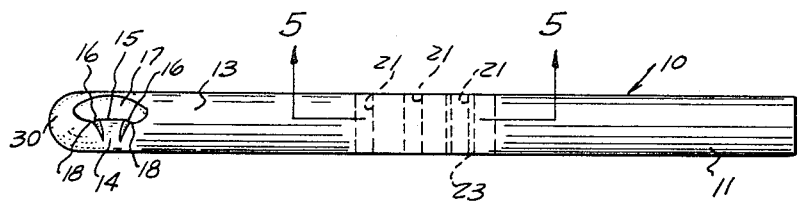
Figure 4:
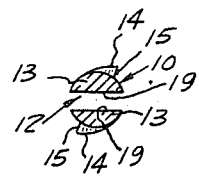
Figure 3:
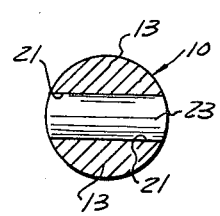
Figure 5:
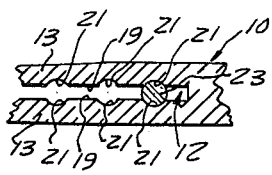
Figure 7:
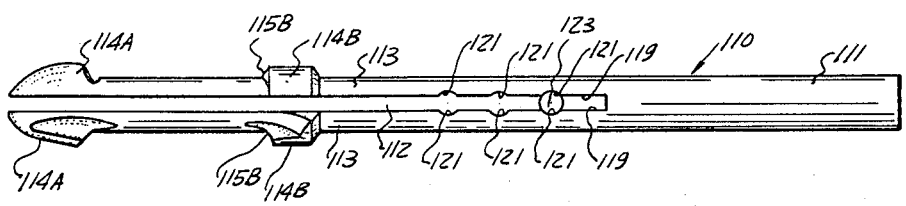
Figure 6:
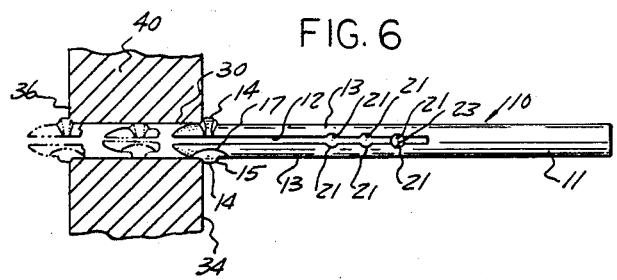
Figure 8:
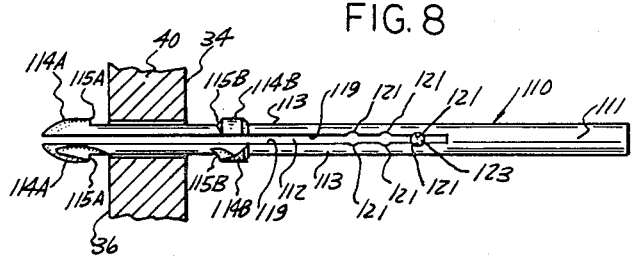

Still further objects and advantages of the present invention will be readily apparent to one skilled in the art to which the invention pertains upon reference to the following drawings in which like reference characters refer to like parts throughout the several views and in which, FIGURE 1 is a side elevational view of one preferred embodiment of the present invention, FIGURE 2 is an elevational top view of the preferred embodiment shown in FIGURE 1, FIGURE 3 is a cross-sectional view taken substantially on line 3—3 of FIGURE 1 and enlarged somewhat for purposes of clarity, FIGURE 4 is a cross-sectional view taken substantially on line 4—4 of FIGURE 1, FIGURE 5 is a fragmentary cross-sectional view taken substantially on line 5—5 of FIGURE 2, FIGURE 6 is an elevational view, partly in section, showing the preferred embodiment of FIGURE 1 in use, and FIGURE 7 is an elevational side view of another preferred embodiment of the present invention, and FIGURE 8 is a view similar to FIGURE 6 but illustrating the preferred embodiment of FIGURE 7 in use.

Now referring to the drawings for a more detailed description of the present invention, FIGURES 1–6 illustrate a preferred deburring tool as comprising an elongated body member 10 having a shank portion 11 adapted for insertion into a suitable driving mechanism (not shown). The body member 10 is provided with a longitudinally extending tension slot 12 forming a pair of substantially parallel and symmetrical support columns or arms 13. Substantially arcuate cutting ridges 14 are provided on the periphery of the support columns 13. The cutting ridges are spaced axially somewhat from the free ends of the support columns 13 and the ends of the support columns 13 are rounded to define a pilot portion 30. The cutting ridges 14 are provided with substantially radially extending flat surface portions 15. These are disposed in substantially parallel planes on opposite sides of the body member 10 and provide sharp cutting edges 16 on each side of the ridges 14. The support columns may be dished as at 17 to produce sharp corner edges 18.

The tension slot 12 is defined by parallel and planar faces 19 formed on the support columns 13. The faces 19 are provided at a plurality of axially spaced points with arcuate transversely extending grooves 21 with each groove 21 one one face 19 coinciding with a groove on the opposite face so that pairs of grooves define oppositely disposed lateral sections of a cylinder which extend transversely across the slot 12. A pin member 23 is adapted to be received in any pair of the grooves 21 and provides a fulcrum for the support columns at the point at which it is positioned so that the tension and flexibility of the support arms or columns 13 will depend upon which particular set of grooves 21 is selected for receiving the pin 23. The pin 23 is cylindrical in form and it is formed on a radius substantially the same or slightly larger than the radius of the cylinder defined by the grooves 21. It is preferred that the pin 23 and the grooves 21 be dimensioned such that the pin will be held in place within the grooves 21 with the tool in the normal position. As long as there is a snug fit between the pin 23 and the spring arms 13 when the pin 23 is in the grooves 21 and the tool is in a nonoperating position the pin 23 will be securely locked upon inward flexing of the spring arms which occurs during the cutting operation of the tool as will be more apparent as the description proceeds.

In operation, the shank portion 11 is inserted into any convenient source of standard rotary driving mechanism. It is apparent that the shank portion may be fashioned into any desirable shape without affecting the tension adjusting means. This eliminates the need for expensive special holders. The tool is then inserted into a workpiece 40 having the hole which is to be deburred as can best be seen in FIGURE 6 until the cutting ridges 14 are closely adjacent to the forward edge 34 of the hole. The tool is then rotated and the cutting edges 16 will remove the burr formed on the outer peripheral edge of the hole of the material which has been drilled. After this burr has been removed the tool is then inserted farther into the hole until the cutting ridges 14 emerge from the other side of the material. Slot 12 permits the arms or columns 13 to be flexed inwardly to permit passage of the ridges 14 through the hole as shown in dashed lines in FIGURE 6. It is apparent that the slot 12 must be sufficiently wide to permit the cutting ridges 14 to pass through the hole. In those uses in which the body member 10 is slightly less than the diameter of the hole the width of the slot 12 will be preferably slightly greater than the difference between the diameters of the body member 10 and the cutting ridges 14. The tool continues to be rotated and is then retracted from the material so that the cutting edges 16 will remove the burr formed on the rear edge 36 of the hole.

It is apparent that the force required to drive the tool through the material and to retract the tool from beyond the inner face of the material will determine the degree of deburring performed. For example, if the pressure required to collapse the support columns 13 is very slight and the material to be worked on is very hard to support columns 13 may be so easily moved together that the cutting ridges 14 will pass into and out of the hole without removing the burrs formed at the edges of the hole. Further, if the material is very soft and the force required to flex the support columns 13 toward one another is relatively high too much of the material at the edges of the drilled hole may be removed upon forcing the tool through the hole and retracting it. Therefore, some means of adjusting the force required to flex the support columns 13 is necessary. In the present invention, such means is provided by the grooves 21 and the pin 23 adapted to be received in any pair of the grooves 21. Depending upon which set of grooves 21 is selected for the pin 23 a tension adjustment will be produced, the tension being determined by the length formed between the free end of the columns 13 and the pin 23. It is apparent that during the cutting operations the spring arms are continuously flexed inwardly from the normal position so that if a firm frictional attachment is produced between the pin 23 and the spring arms 13 when the cutting tool is not in use, during the cutting operation the pin 23 will be securely locked in position.

In the preferred embodiment of the present invention illustrated in FIGURES 7 and 8 an elongated body member 110 is provided with a shank portion 111 and a longitudinally extending tension slot 112. The slot 112 forms a pair of support columns or arms 113. Spaced cutting ridges 114A and 114B are provided on the outer periphery of the support columns 113. The cutting ridges 114A are each provided with a trailing cutting edge 115A and the cutting ridges 114B are each preferably provided with an inclined leading cutting edge 115B. The tension adjusting means of the embodiment illustrated in FIGURES 7 and 8 is the same as that in the first embodiment and comprises a plurality of axially spaced pairs of transversely extending arcuate grooves 121 formed in the planar parallel faces 119 of the support columns or arms 113 and a pin 123 adapted to be received in any pair of the pairs of grooves 121 as discussed above. As illustrated in FIGURE 8 the preferred embodiment of FIGURES 7 and 8 is used to perform the same function as the embodiment disclosed above but is used somewhat differently. Upon insertion of the tool through the material 40 as illustrated in FIGURE 8 no cutting action is performed. When the tool is positioned within the material 40 intermediate the cutting ridges 114A and 114B and with the tool rotating the tool is moved forwardly and rearwardly to bring the cutting edges 115A–115B in turn against the opposite surfaces of the drilled material 40. The inclined cutting edge 115B will produce a chamfer in the forward face 34 of the material but it is apparent that cutting ridge 114B can be fashioned to perform just the deburring operation.

It is apparent from the above description that deburring tools of an improved construction have been provided on each of the embodiments illustrated; tension adjusting means are provided which are more economical to produce than those heretofore provided, which can be adjusted without the necessity of removing the tool from the driving mechanism or the workpiece and which, since there are no threaded fastening means to become loosened, offer very little danger of the tool coming out of adjustment during use. Further, the particular means employed permits any desired variation to be made in the shank portion without interfering with the tension adjusting means and without requiring expensive special holders while also permitting the provision of tension adjustment where lack of clearance prohibits tools with collar type adjusting means.

It is further apparent that many types of cutting edges may be utilized and that many other changes can be made in the present invention without departing from the spirit of the invention as expressed by the scope of the appended claims.

I claim:

1. In a tool for removing the burrs formed on the edge of drilled holes having an elongated body member with a longitudinal slot extending from one end of the body member to a point spaced from the other end of the body member, and cutting means carried on the outer periphery of the body member, the improvement comprising a plurality of longitudinally spaced pairs of transversely extending arcuate grooves formed in the body member on opposite sides of the slot, and a pin member adapted to be received in any pair of said pairs of grooves to engage the sides of said body member whereby said pin member provides a fulcrum which varies the tension of said cutting means depending on the particular pair of grooves selected to receive said pin member.

2. The tool as defined in claim 1 and in which said cutting means comprises;
    (a) a pair of axially spaced substantially arcuate ridges provided on the outer surface of said body member,
    (b) said ridges each being provided with a substantially radially extending cutting edge.

3. The tool as defined in claim 1 and in which said cutting means comprises;
    (a) a pair of substantially arcuate ridges provided on the outer periphery of said body member,
    (b) said ridges being provided with face portions substantially coplanar with respect to a plane containing the longitudinal axis of said body member, and
    (c) each of said face portions forming a pair of spaced cutting edges.

4. In a deburring tool having a cylindrical body with a through slot formed therein and extending axially to one end of the body to provide a pair of spaced apart support columns which are adapted to flex toward and away from one another, the support columns forming integral extensions of the unslotted portion of the body, the support columns each having adjacent but spaced axially inwardly of the free end thereof of a cutting tool comprising a radial enlargement formed with cutting edge which extends generally transversely of the longitudinal axis of the slot, opposed inner faces of the support columns defining the opposite sides of the slot, the improvement comprising a plurality of longitudinally spaced pairs of grooves formed in the inner faces of the support columns said grooves coinciding in pairs and forming lateral sections of cylindrical surfaces extending transversely to the opposed inner faces, and a pin member adapted to be received in any pair of said pairs of grooves to engage the support columns on opposite sides of the slot whereby to provide a fulcrum which varies the tension of the support columns depending upon the particular pair of grooves selected to receive said pin member.

5. A deburring tool as defined in claim 4 and in which said pin member is cylindrical and is formed on a radius substantially equal to the radii forming the surfaces defining said grooves.

6. A deburring tool as defined in claim 4 and including a second cutting tool provided on each of said support columns axially spaced from and intermediate the unslotted portion of said body and said first mentioned cutting tools.

7. A deburring tool as defined in claim 4 and in which the free ends of said support columns extending beyond said cutting tools comprises a pilot portion of a smaller radius than said cutting tools.

8. A deburring tool comprising;
    a cylindrical body having a through slot formed therein and extending axially to one end of the body to provide a pair of spaced apart support columns which are adapted to flex toward and away from one another,
    said support columns forming integral extensions of the unslotted portions of the body,
    said support columns each having adjacent but spaced axially inwardly of the free end thereof a radial enlargement formed with a cutting edge which extends generally transversely to the longitudinal axis of said slot,
    opposed inner faces of said support columns defining the opposite sides of said slot, and
    means for varying the tension of said support columns consisting of a plurality of longitudinally spaced pairs of grooves formed in said inner faces of said support columns, said grooves coinciding in pairs and forming lateral sections of cylindrical surfaces extending transversely to said opposed inner faces and a pin member adapted to be received in any pair of said pairs of grooves to engage said support columns on opposite sides of said slot whereby to provide a fulcrum which varies the tension of said support columns depending upon the particular pair of grooves selected to receive said pin member.

References Cited

UNITED STATES PATENTS 3,230,798   1/1966   Kubicek et al. _____ 77—73.5

FRANCIS S. HUSAR, *Primary Examiner.*